(12) United States Patent
Rhodes et al.

(10) Patent No.: US 9,672,947 B2
(45) Date of Patent: Jun. 6, 2017

(54) FINNED STRAINER

(75) Inventors: David Bruce Rhodes, Deep River (CA); James Edward Allan McGregor, Pembroke (CA)

(73) Assignee: ATOMIC ENERGY OF CANADA LIMITED, Chalk River, Ontario (CA)

( * ) Notice: Subject to any disclaimer, the term of this patent is extended or adjusted under 35 U.S.C. 154(b) by 0 days.

(21) Appl. No.: 11/666,896

(22) PCT Filed: Nov. 4, 2005

(86) PCT No.: PCT/CA2005/001723
§ 371 (c)(1),
(2), (4) Date: Jan. 30, 2008

(87) PCT Pub. No.: WO2006/050606
PCT Pub. Date: May 18, 2006

(65) Prior Publication Data
US 2008/0156712 A1    Jul. 3, 2008

(30) Foreign Application Priority Data

Nov. 15, 2004   (CA) .................................... 2,487,584

(51) Int. Cl.
*B01D 29/33*   (2006.01)
*G21D 1/02*    (2006.01)
*B01D 29/39*   (2006.01)

(52) U.S. Cl.
CPC .............. *G21D 1/02* (2013.01); *B01D 29/333* (2013.01); *Y02E 30/40* (2013.01)

(58) Field of Classification Search
CPC ......... G21D 1/02; B01D 29/333; Y02E 30/40
(Continued)

(56) References Cited

U.S. PATENT DOCUMENTS 3,074,561 A    1/1963   Mummert
3,402,531 A *  9/1968   Farr ..................... B01D 46/125
                                                    55/350.1
(Continued)

FOREIGN PATENT DOCUMENTS

CA    2 498 815 A1    4/2004
CN    2134617 Y       5/1993
(Continued)

OTHER PUBLICATIONS

Supplementary European Search Report for European Patent Application No. EP 05 80 7902, European Patent Office, Munich, Germany, completed Feb. 19, 2009.
(Continued)

*Primary Examiner* — Madeline Gonzalez
(74) *Attorney, Agent, or Firm* — Norton Rose Fulbright Canada LLP

(57) ABSTRACT

The present invention relates to filters used to remove debris from water being sucked into a piping system. It has particular application use in nuclear power plants, which, after a loss of coolant accident, must pump cooling water back into the reactor core from a collection sump. This water may contain various types of debris that must be removed before the water is sent back into the reactor cooling system. There are restrictions on the allowable pressure drop across the strainer and the space available for installing this equipment. The finned strainer of the present invention addresses these issues while maximizing the quantity of debris filtered from the water.

16 Claims, 10 Drawing Sheets

(58) Field of Classification Search
USPC ....... 210/456, 137, 499, 498, 224–231, 486, 210/459, 487, 331, 345–347, 493.1, 258, 210/494.2, 204, 228, 346
See application file for complete search history.

(56) References Cited

U.S. PATENT DOCUMENTS

| | | | |
|---|---|---|---|
| 3,542,205 A * | 11/1970 | O'Cheskey | 210/331 |
| 4,129,429 A * | 12/1978 | Humbert, Jr. | B01D 46/0012 210/493.1 |
| 4,268,290 A * | 5/1981 | Barrington | 55/521 |
| 4,352,739 A | 10/1982 | Oliver, Jr. et al. | |
| 4,728,422 A | 3/1988 | Bailey | |
| 4,789,474 A * | 12/1988 | Gaudfrin | 210/333.01 |
| 4,963,258 A | 10/1990 | Yagishita | |
| 5,158,586 A | 10/1992 | Layton | |
| 5,328,600 A | 7/1994 | Cates et al. | |
| 5,547,574 A | 8/1996 | Ginn et al. | |
| 5,690,824 A | 11/1997 | Stuth | |
| 5,759,398 A | 6/1998 | Kielbowicz | |
| 5,835,549 A | 11/1998 | Sibiga | |
| 6,186,337 B1 * | 2/2001 | Adams et al. | 209/401 |
| 6,332,977 B1 | 12/2001 | Janecek | |
| 6,355,082 B1 | 3/2002 | Ishibe | |
| 7,135,114 B2 | 11/2006 | Nonninger et al. | |
| 2004/0124158 A1 | 7/2004 | Smith et al. | |
| 2007/0251872 A1 * | 11/2007 | Haes | B01D 46/0005 210/224 |
| 2008/0156712 A1 | 7/2008 | Rhodes et al. | |
| 2010/0148477 A1 | 6/2010 | Rick | |
| 2012/0273407 A1 | 11/2012 | Haque et al. | |

FOREIGN PATENT DOCUMENTS

| | | |
|---|---|---|
| CN | 101102827 A | 1/2008 |
| CN | 201233084 Y | 5/2009 |
| EP | 0 063 412 A1 | 10/1982 |
| EP | 0 546 308 A1 | 6/1993 |
| GB | 158663 A | 2/1921 |
| JP | 28-009791 B | 6/1928 |
| JP | 48087466 | 10/1973 |
| JP | 09-122408 A | 5/1997 |
| JP | 10048382 A | 2/1998 |
| JP | 2001-009214 A | 1/2001 |
| JP | 2002-282853 A | 10/2002 |
| WO | WO 97/36664 A1 | 10/1997 |
| WO | WO 2004/071620 A1 | 8/2004 |

OTHER PUBLICATIONS

International Search Report for International Patent App. No. PCT/CA2005/001723, Canadian Intellectual Property Office, Canada, mailed Feb. 28, 2006.
International Preliminary Report on Patentability for International Patent App. No. PCT/CA2005/001723, Canadian Intellectual Property Office, Canada, issued May 15, 2007.
Extended European Search Report for European Patent App. No. 10 003 148, European Patent Office, Germany, dated Jun. 1, 2010.
Communication pursuant to Article 94(3) EPC in European Patent App. No. 05 807 902 European Patent Office, Germany, dated Mar. 24, 2011.
Communication pursuant to Article 94(3) EPC in European Patent App. No. 10 003 148 European Patent Office, Germany, dated Mar. 24, 2011.
Office Action for Canadian Patent App. No. 2,585,806, Canadian Intellectual Property Office, dated Feb. 16, 2012.
Office Action for Japanese Patent Application No. 2007-540467, dispatched Jan. 25, 2011, with unverified English translation.
KIPO's Notice of Preliminary Rejection (English translation) in Korean Patent App. No. 10-2007-7011027, mailed Jul. 1, 2011.
English language Abstract of Japanese Patent Publication No. 09-122408 A, Japanese Patent Office, Patent & Utility Model Gazette DB, Patent Abstract of Japan (1997).
English language Abstract of Japanese Patent Publication No. 2001-009214 A, European Patent Office, espacenet database—Worldwide (2001).
English language Abstract of Japanese Patent Publication No. 2002-282853 A, European Patent Office, espacenet database—Worldwide (2002).
Communication pursuant to Article 94(3) EPC for European No. 10 003 148.3, European Patent Office, Munich, Germany, dated Feb. 27, 2012.
Rüdinger, V. et al., "High-Strength High-Efficiency Particulate Air Filters for Nuclear Applications," *Nucl. Technol.* 92:11-29, American Nuclear Society (1990).
Nonverified English-language abstract of CN 201233084 Y published Jun. 6, 2006, Espacenet, European Patent Office.
Office Action for Chinese Patent Application No. 201080034643.8, mailed Jun. 11, 2015, with English translation.
Office Action for co-pending U.S. Appl. No. 13/379,915, § 371(c) Date Jul. 20, 2012, inventors: Haque et al., U.S. Patent and Trademark Office, Alexandria, VA, mailed Oct. 22, 2014.

* cited by examiner

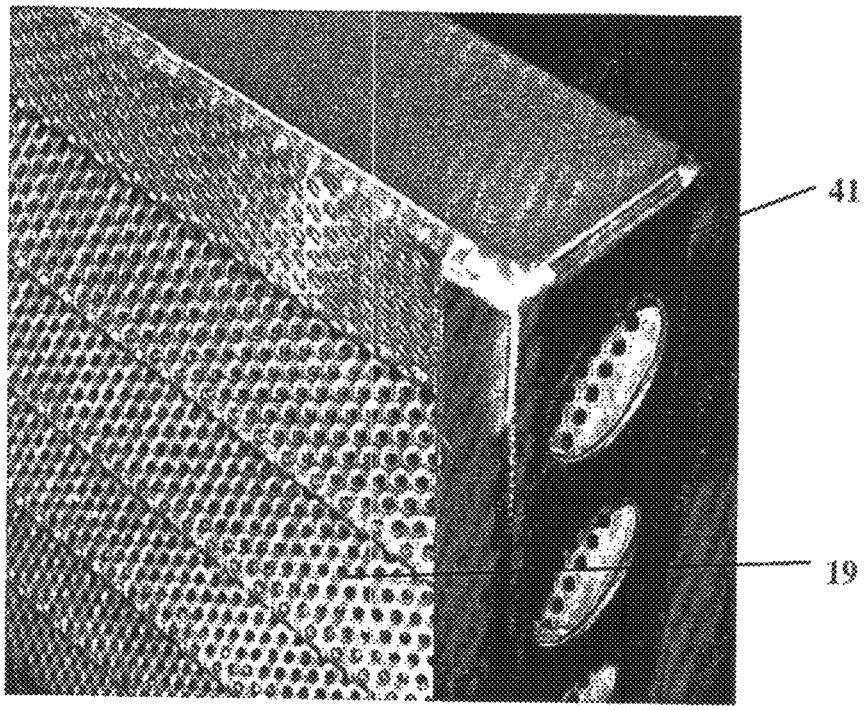
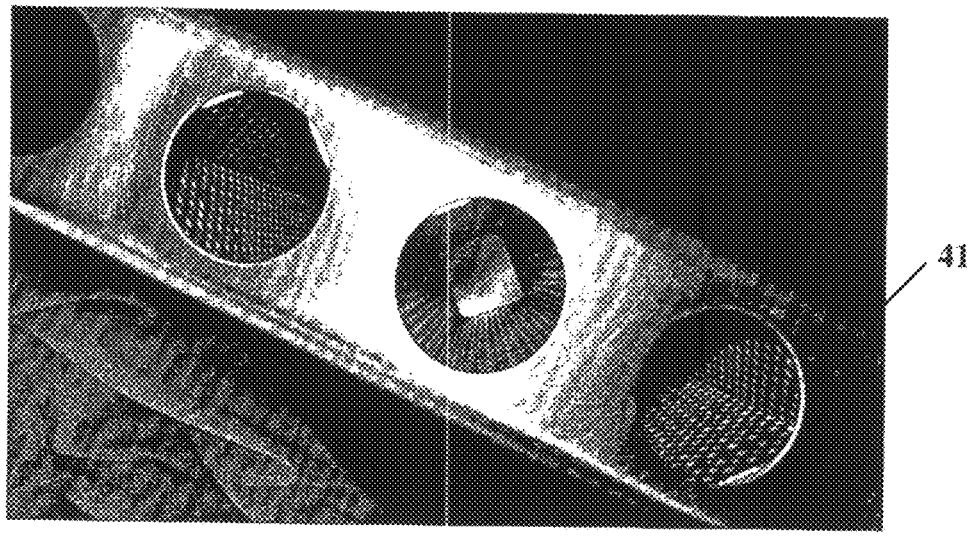

FINNED STRAINER

FIELD OF THE INVENTION

The present invention pertains to the field of filters used to remove debris from water being sucked into a piping system. More particularly, the present invention relates to the field of filters used in nuclear power plants.

BACKGROUND

Nuclear plants have various safety systems to ensure that the nuclear fuel in the reactor core remains cooled in all credible accident scenarios. One such scenario is a "loss of coolant accident," in which an external pipe is postulated to break, allowing a large amount of water to escape from the reactor cooling system. This water may dislodge solid debris from neighbouring pipes or other reactor structures. The water, along with some of the dislodged debris, will flow to the lowest parts of the reactor building into a sump. Plants are equipped with safety systems that pump water from the sump back into various reactor cooling systems. Strainers on the pump intakes ensure that any debris large enough to clog equipment in these systems is prevented from entering. Depending on the type of debris, the first layer to deposit on the strainer may form a finer filter than the underlying screen, and catch many smaller particles.

Strainers must have enough screen area that the debris layer on the strainer is not too thick to cause unacceptably high restriction to flow. Strainers must also be as small as possible to fit into the available space. Therefore compactness, i.e., accommodating the most screen area in the smallest volume, is important.

Conventional strainers in many nuclear plants are simple box-type devices mounted over the pump intakes. Newer more advanced strainers often have an irregular surface to increase the surface area.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

In accordance with one aspect of the invention there is provided a strainer for filtering debris from a fluid comprising an elongated header defining an enclosed flowpath, having an outlet in fluid communication with a suction source and a plurality of inlet apertures disposed along the length of said flowpath, said flowpath exhibiting a pressure drop in the direction of fluid flow; a strainer element disposed in each said inlet aperture for straining debris from fluid entering said flowpath; and a flow controlling device for maintaining substantially uniform fluid flow through strainer elements located at different positions along said flowpath.

In accordance with another aspect of the invention, the flow controlling device comprises an orifice for producing a pressure drop between an inlet aperture and the flowpath located at a position closer to said suction source that is greater than the pressure drop between an inlet aperture and said flowpath located at a position farther from said suction source. The orifice can be in the form of a nozzle for accelerating the fluid entering said flowpath in a direction substantially parallel thereto and can be formed in a baffle disposed in said header, the baffle defining a collection channel enclosing a plurality of apertures.

In accordance with another aspect of the present invention, the header has a generally planar side-wall and the inlet apertures are a series of substantially parallel slots formed in the side-wall in a direction transverse to said flowpath. The strainer elements can be in the form of flat-surface fins projecting outwardly from the apertures in the planar side-wall.

In accordance with another aspect of the present invention, there is provided a strainer for filtering debris from a fluid comprising a header defining an enclosed volume and having an outlet in fluid communication with a suction source, said header having a plurality of inlet aperture slots formed therein, a fin-like strainer element projecting outwardly from each aperture slot for straining debris from said fluid, each said strainer element comprising a perimeter frame and a pair of fluid permeable screens fixed thereto in opposed spaced relation, and at least one fluid flow channel therebetween in fluid communication with said enclosed volume through a marginal side edge of said frame and said aperture slot. The fluid permeable screens can be formed of perforated metal sheet or mesh. A corrugated metal spacer can be disposed between the fluid permeable screens for maintaining said fluid permeable screens in spaced relation, and a plurality of flow channels can be defined between said corrugated metal spacer and said fluid permeable screens. The perimeter frame can be impermeable to fluid except at said one marginal side edge.

In accordance with another aspect of the present invention, the fluid permeable screens are each formed of corrugated metal mesh having a plurality of parallel peaks and valleys, said screens being maintained in opposed spaced relation by contact at alternating peaks and defining a plurality of said flow channels therebetween.

DETAILED DESCRIPTION OF THE INVENTION

Figure 1:
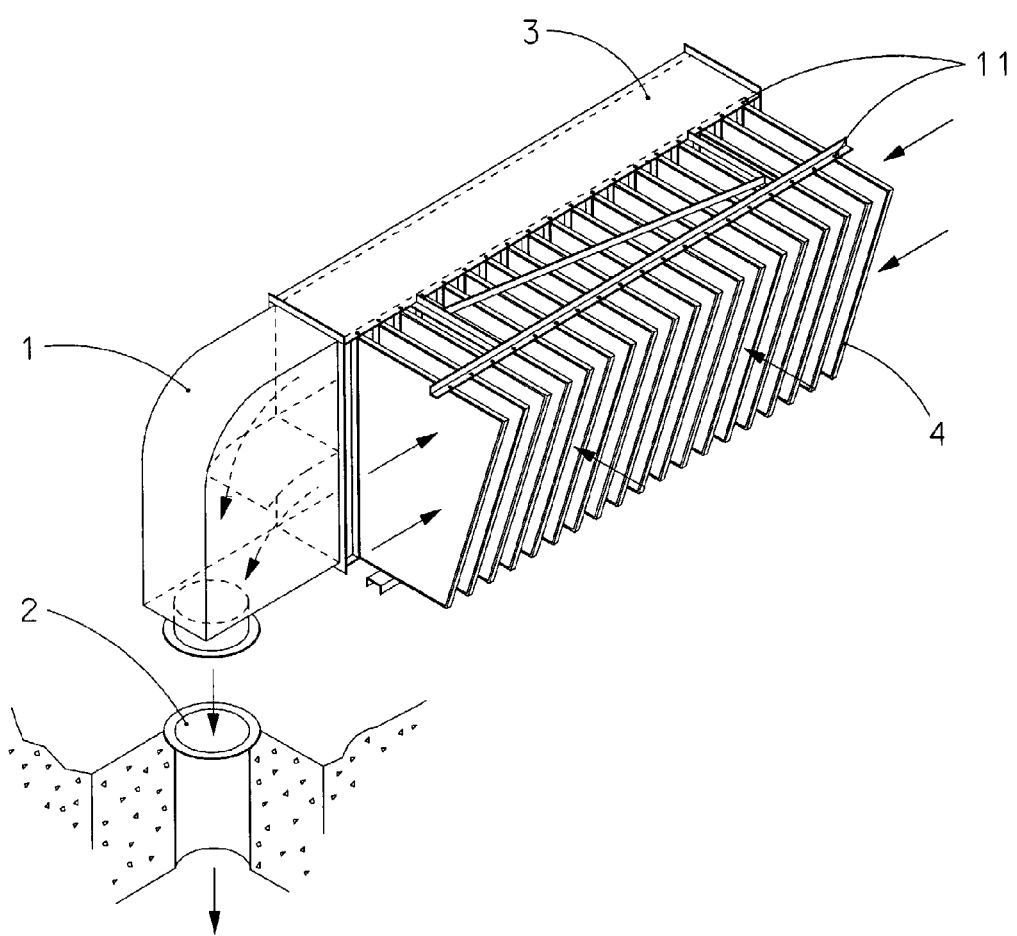
FIG. 1 is an isometric view of a strainer module for connection to a pump intake in accordance with an embodiment of the present invention.
Figure 2:
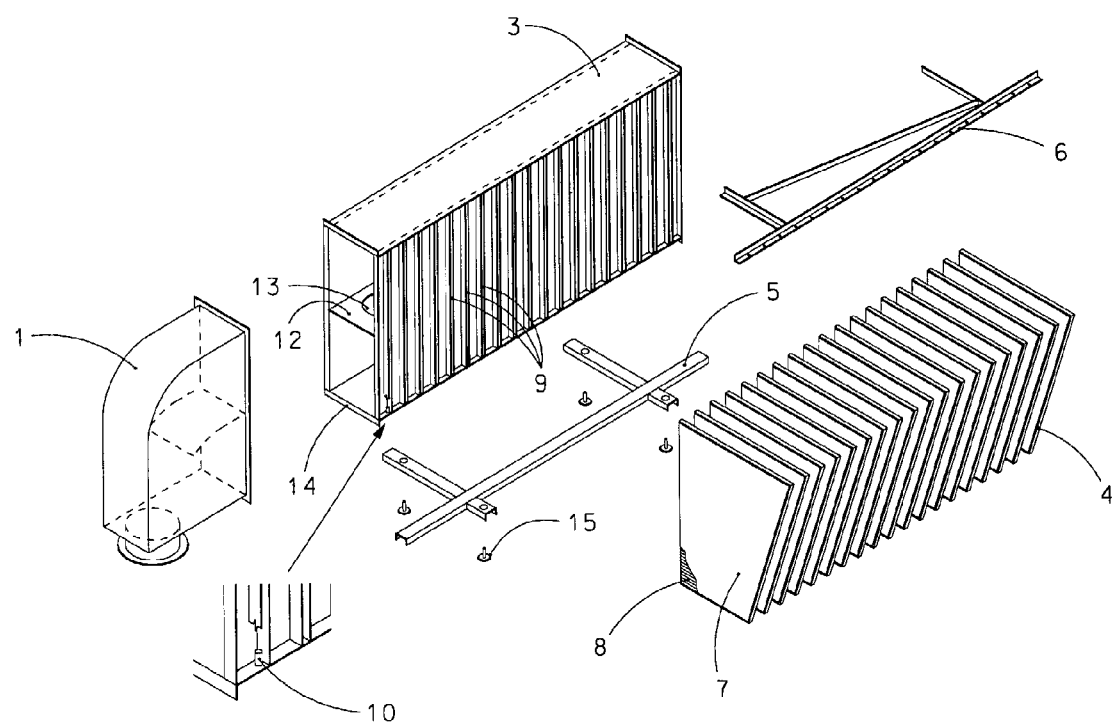
FIG. 2 is an exploded view of the strainer module shown in FIG. 1.

Referring to FIGS. 1 and 2, the strainer module of the present invention comprises elongated header 3 that defines an internal fluid flowpath that is in fluid communication with a suction source through pump intake pipe 2 which may be located in the floor or wall through one or more connection(s) 1. Header 3 has a generally planar sidewall with a plurality of inlet apertures 9 in the form of a series of substantially parallel elongated slots disposed along the length of the header to accommodate fins 4. The inlet apertures are oriented in a direction transverse to the fluid flowpath within header 3. Strainer elements in the form of hollow flat-surface fins 4 may be mounted on the sides (as shown in FIG. 1), top, or bottom of header 3 and project outwardly from inlet apertures 9. Fins 4 may have a uniform or variable spacing and are located by mounting frames 5 and braces 6. In a preferred embodiment, fins are easily removable, using a pins 10 and bolts 11, but they may also be permanently attached to header 3.

Water enters the strainer through fluid permeable screens 7 on the surface of the fins 4, leaving debris on the screens. Water then flows through the fluid flow channel in hollow core 8 of the fin 4 towards header 3. Various portions of header 3, particularly the portion between fin slots 9, may be made using fluid permeable material to increase the filtration area. Header 3 may have one or more baffle plates 12 to provide structural support for the sides to resist high suction pressures. Baffle plates 12 have large holes 13 to ensure flow velocity in the fluid flow channel in header 3 is the same above and below the baffle.

The ends of each header 3 have flanges 14 that allow adjoining modules to be attached together. Modules may be attached together, or they may be independently mounted with seals between modules. Mounting frames 5 may be provided under the module. Mounting frames 5 have adjustable-height mounts 15 that allow the device to be installed on floors that are not level.

Figure 3:
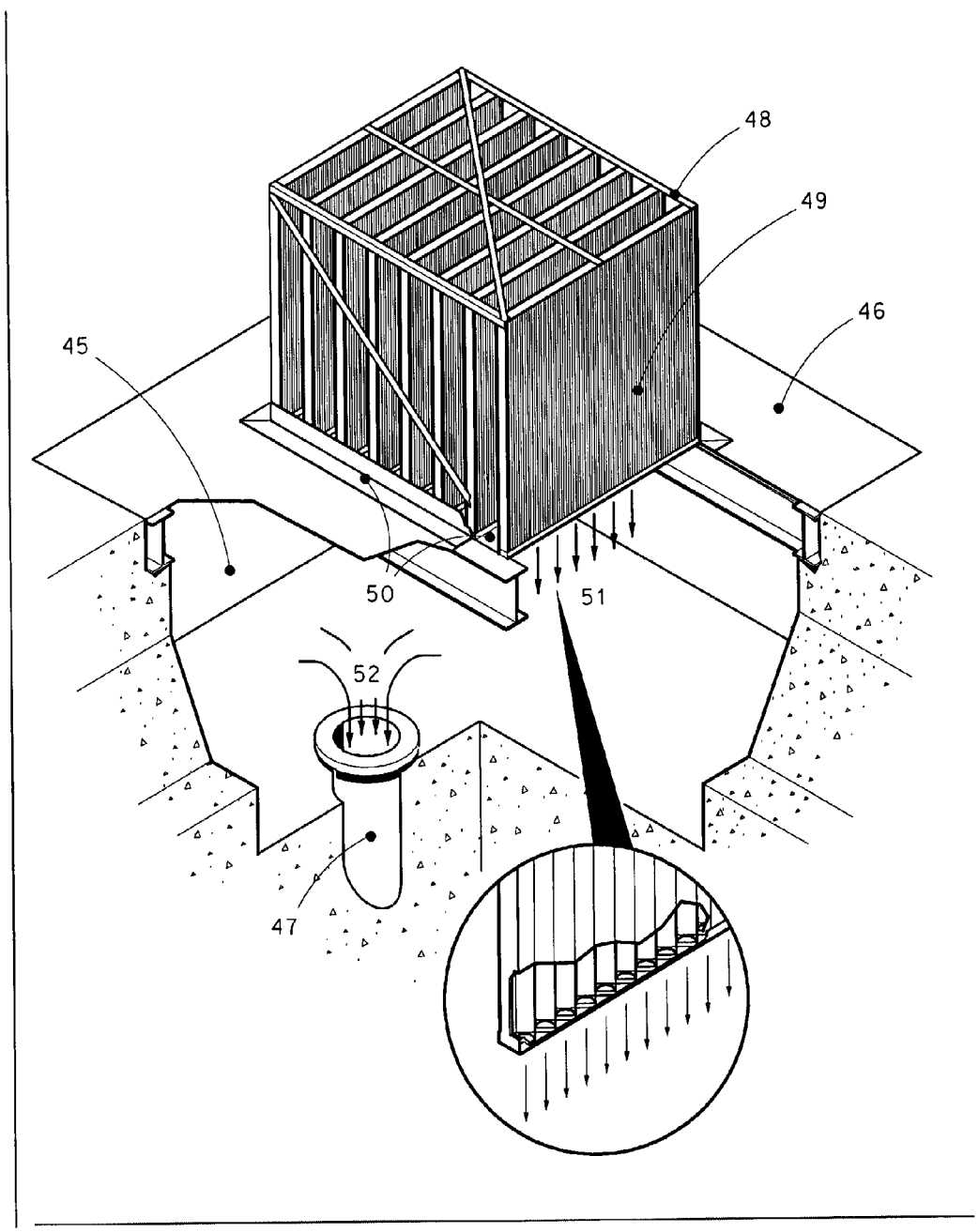
FIG. 3 is a cut-away isometric view of a strainer module mounted directly onto a sump in accordance with an embodiment of the present invention.

FIG. 3 shows an alternative embodiment of the present invention. This embodiment is useful for situations where there is a pre-existing sump 45 with a cover 46 (which could be pre-existing or installed specifically to support the strainer modules) and a pump intake 47 inside the sump 45. Strainer module 48 comprises fins 49 mounted in a frame 50 with appropriate bracing. For simplicity, only one module has been shown in FIG. 3. If required, a plurality of strainer modules 48 can be mounted in a similar manner over sump 45.

Flow enters fins 49 in the same manner as described above in relation to the embodiment shown in FIGS. 1 and 2, but then flows directly into sump 51, and then into the pump intake 52. Pump intake 52 may be modified to reduce inlet losses. No separate collection header is required for this arrangement, because sump 51 itself performs this function. Undesirable bypass flow between the sump cover 46 and the module frame 50 can be prevented using close tolerances between mating parts, or using wire mesh gaskets or any other suitable type of seal, such as item 25 shown in FIG. 5 on the edge of the fin. Suitable portions of the module frame 50 or sump cover 46 may be made from perforated metal sheet to increase the filtration area. To make use of some of the volume of sump 51, the strainer module can be recessed, either partially or completely, into the sump below the level of the floor. In such a case, the frame 50 of the module would extend down from the floor level to the bottom of the module in order to prevent flow from bypassing the filtration elements of the strainer.

Air ingestion can be prevented by ensuring that there is a sufficient height of water above the strainer. In the alternative, a horizontal cover (not shown) can be added over the fins. This cover allows the fins to be closer to the water surface without ingesting air or causing hollow-core vortices.

Various types of bracing, such as those shown in FIGS. 1, 2 and 3, are used to ensure that the strainer is sufficiently rigid to resist the predicted seismic and pressure loads. In addition, external bracing, such as indicated by reference numeral 6 in FIG. 2, may also be placed between fins.

For all applications, it is desirable to optimize the design for the type and quantity of debris that the strainer is required to handle. Two basic factors need to be considered: the filtration area required, and the potential volume of debris that must be accommodated within the strainer. The number of fins is determined by the required filtration area, and then fin spacing can be varied to ensure that there is sufficient space between fins to accommodate the potential debris volume. The strainer module is advantageously fabricated in a size that is easily manageable and can be moved into place without interference with surrounding equipment. In addition, a complete strainer assembly may contain as many strainer modules as necessary.

Two types of fins that may be incorporated in the apparatus of the present invention are discussed below in relation to FIGS. 4, 5, 6 and 8.

Flat-Surface Fin

Figure 4:
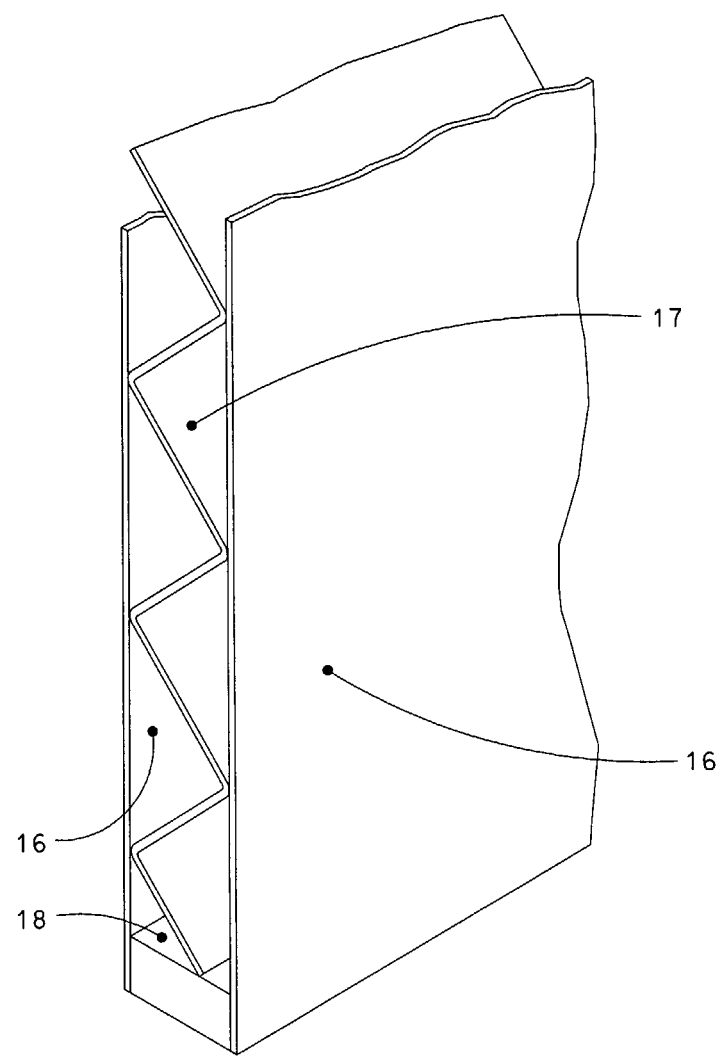
FIG. 4 is a cut-away isometric view of a section of a flat-surface fin in accordance with an embodiment of the present invention.

Referring now to FIG. 4, in accordance with one aspect of the present invention, flat-surface fins, have a pair of planar fluid permeable screens 16 of perforated metal sheet on each side of the fin in opposed spaced relation. Screens 16 filter debris from the water entering the strainer. The two screens 16 are separated by a corrugated metal spacer 17. Spacer 17 provides stiffness and strength, and also forms flow channels between screens 16 to header 3. The edges of screens 16 are enclosed by perimeter frame 18. The flow channels between screens 16 are open to fluid communication with the enclosed flowpath in header 3 through the marginal side edge of frame 18 that fits into aperture 9 of header 3. Frame 18 also adds significantly to the structural strength of the fin.

If the application requires smaller filtration holes than are achievable using standard perforated metal mesh, a layer of fine wire mesh may be laminated onto the surface of perforated metal screens 16 of the fin.

The advantages of the fin construction shown in FIG. 4 include simplicity of manufacture and minimal internal volume.

Corrugated-Surface Fin

Figure 5:
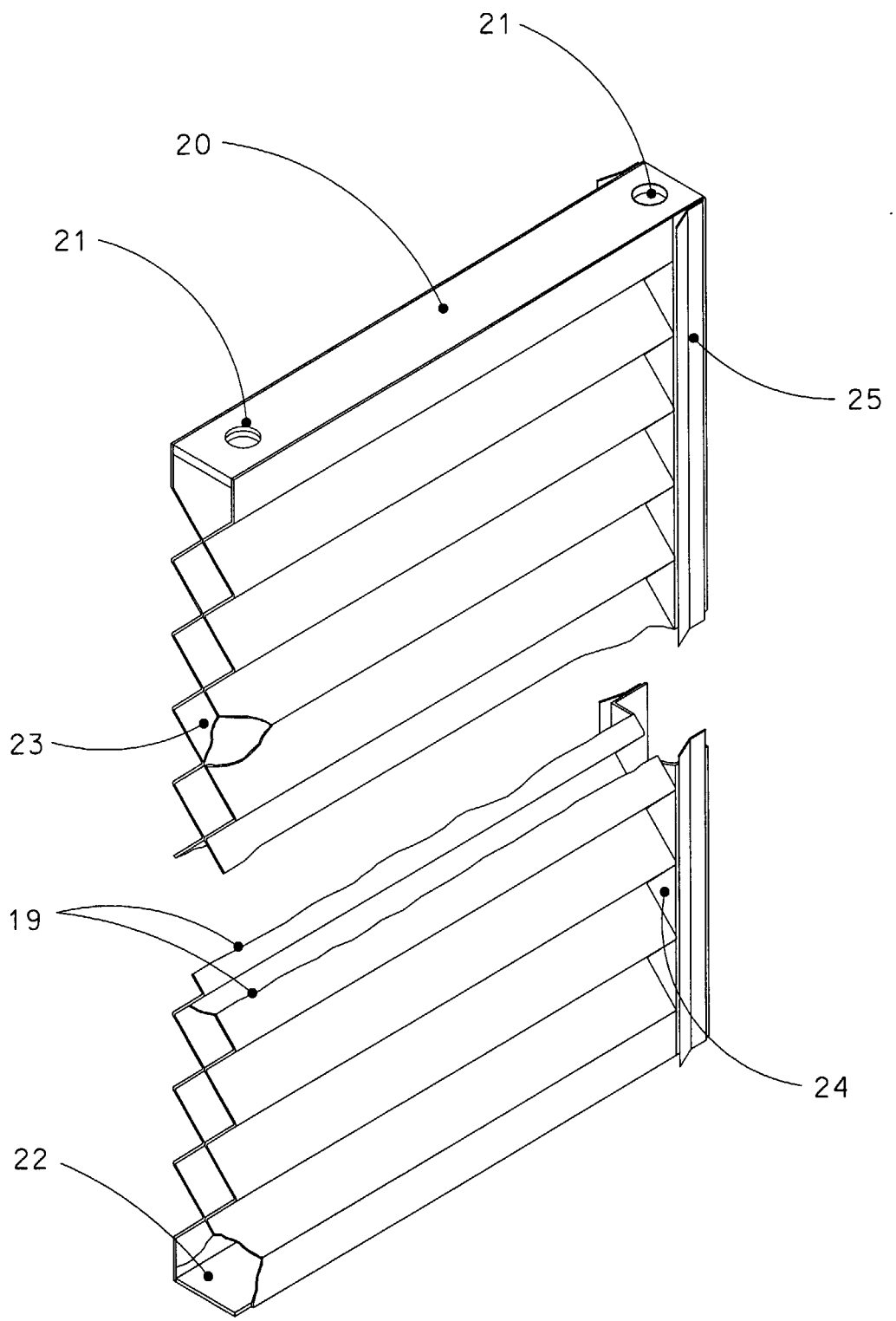
FIG. 5 is a cut-away isometric view of a section of a corrugated-surface fin in accordance with an embodiment of the present invention.
Figure 6:
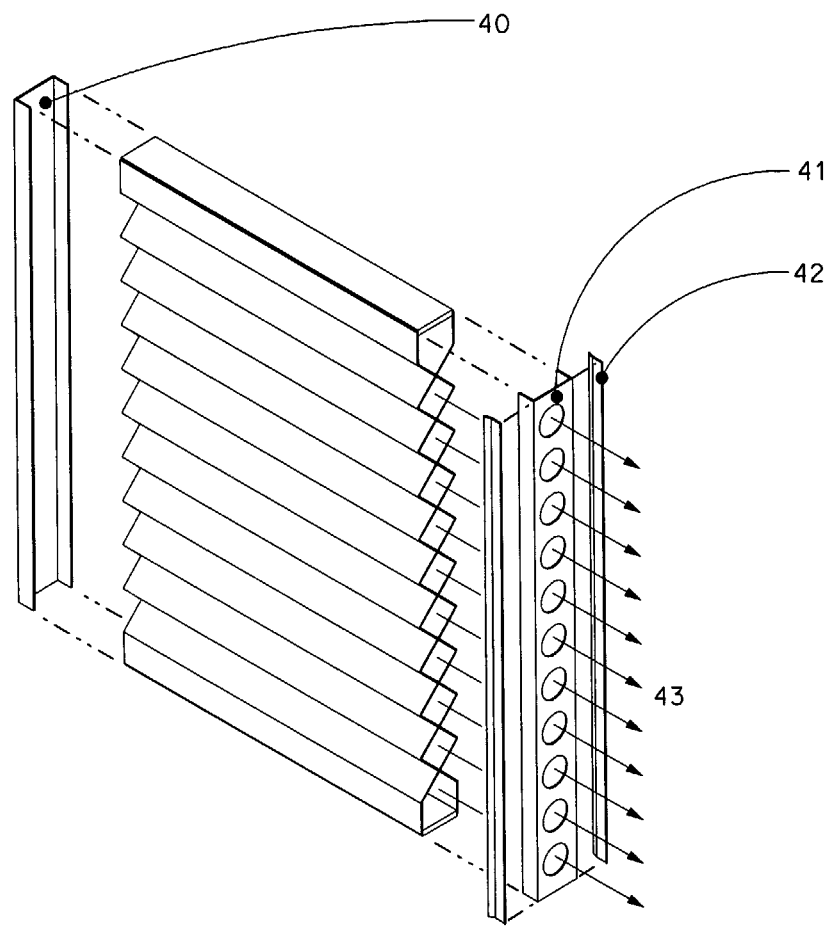
FIG. 6 is an exploded view of a corrugated-surface fin in accordance with an embodiment of the present invention.
Figure 8:
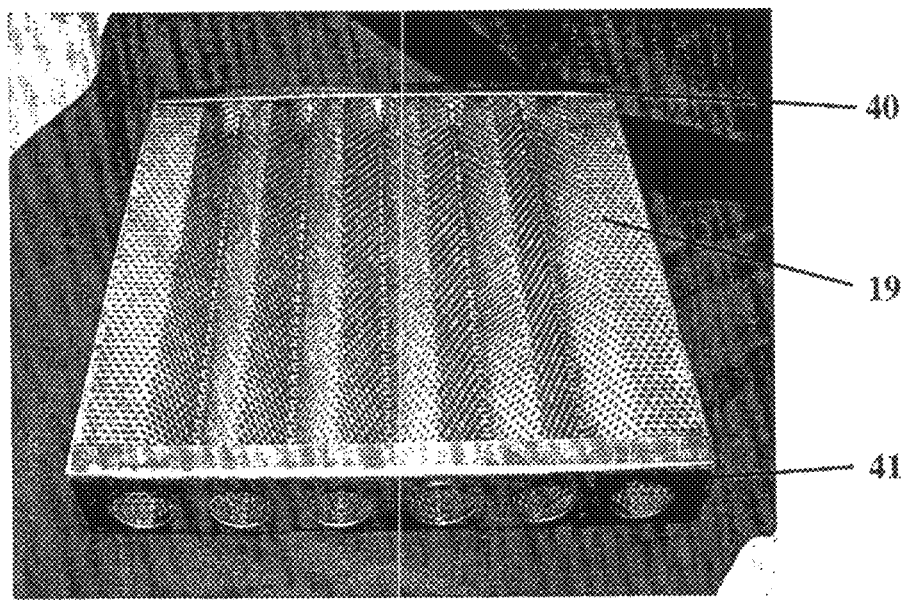
FIG. 8 depicts a corrugated-surface fin in accordance with an embodiment of the present invention.
Figure 8:
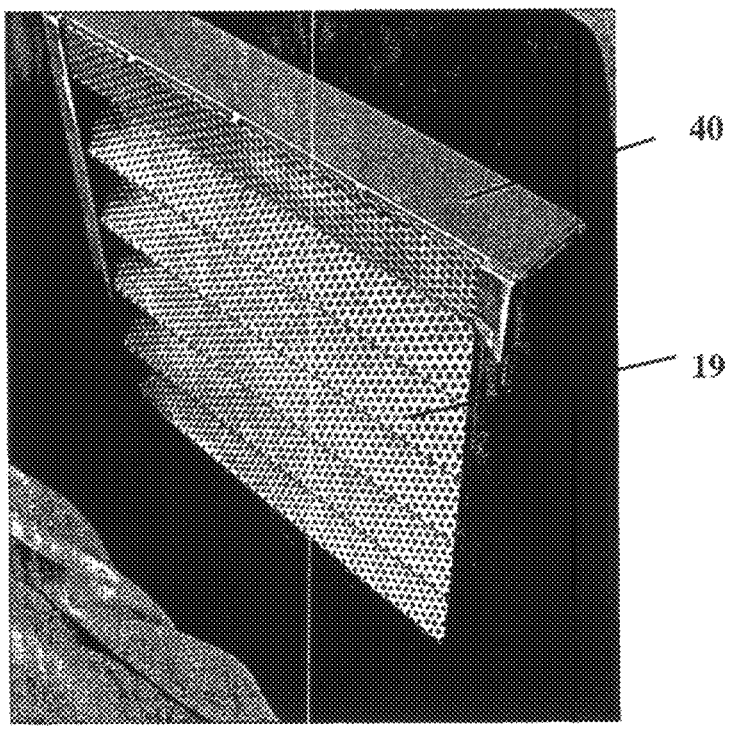
Figure 8:
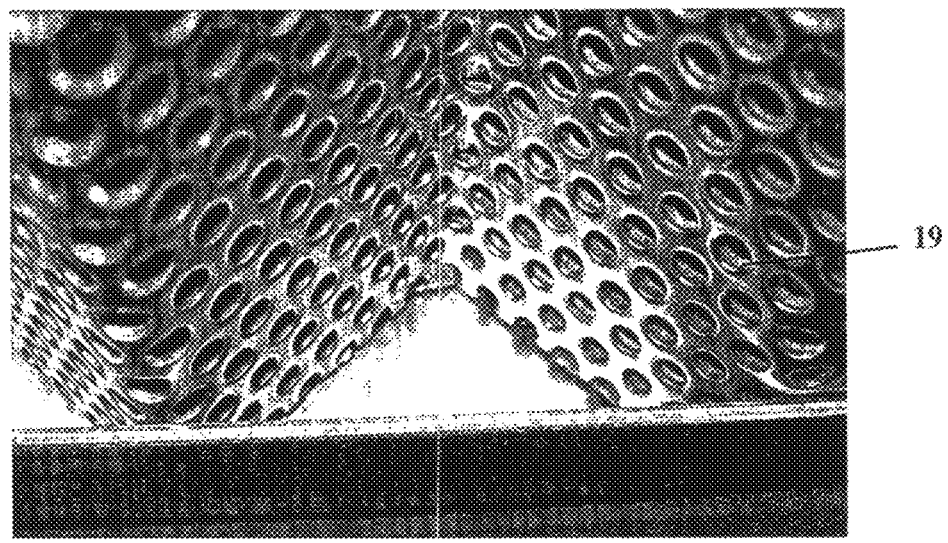
Figure 8:
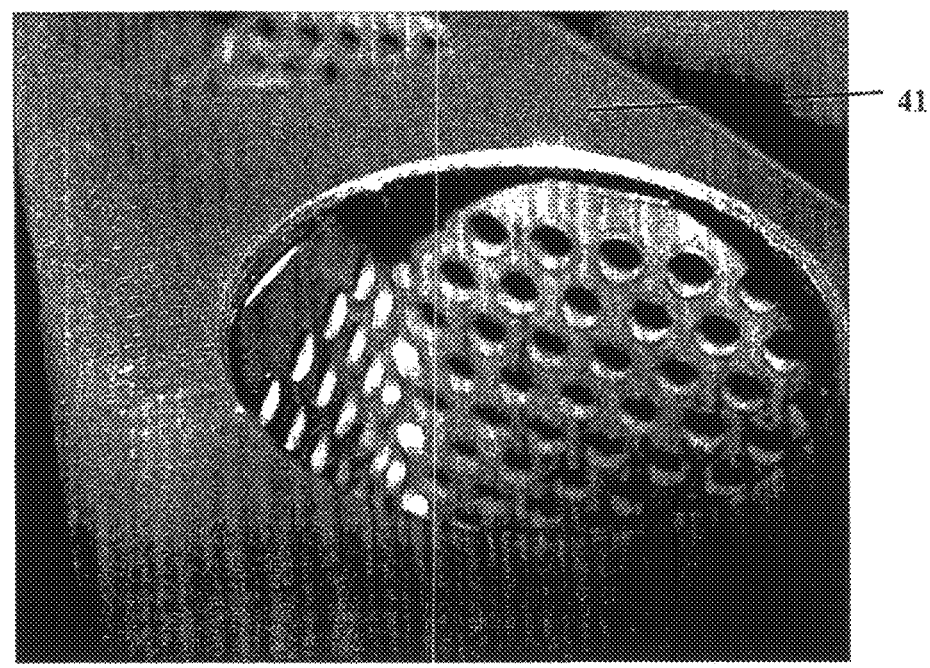

Referring now to FIGS. 5, 6 and 8, in accordance with another aspect of the present invention, corrugated-surface fins are constructed of two layers of perforated metal screen 19 that have been corrugated to increase their exposed surface area. Debris filtered out of water entering the strainer is deposited on these corrugated surfaces.

The corrugations provide a number of advantages. The large increase in filtration surface area over a flat screen is a very significant advantage for thin debris layers, which often pose more of a problem than more porous thick debris layers. The increased area reduces the restriction to flow entering the strainer by decreasing the water velocity through the screen and reducing the thickness of debris (because it is spread over a larger area). The "peaks" of the corrugations also reduce the pressure drop by tending to encourage a locally non-uniform debris bed. Even with layers of debris that are thicker than the height of the corrugations, there can be a significant benefit, because fine particulates often migrate through the debris bed and concentrate near the filtration surface, causing a thin relatively impermeable layer at the surface. The resistance of this thin layer to flow entering the strainer is reduced with the larger screen area achieved by the corrugations.

Another important feature of this design is that the corrugated screens can be made strong enough to be relied on as the sole structural element in the fin. Moreover, the screen can also be formed using relatively thin gauge material. This minimizes the amount of material required to make a fin, saving cost and making the fins easier to handle because of their reduced weight.

The corrugated metal mesh screens have a plurality of parallel "peaks" and "valleys" and are positioned in opposed spaced relation such that alternating peaks in one screen are in tip-to-tip contact with alternating peaks in the opposed screen. This configuration forms hollow internal channels for fluid entering the strainer to flow towards the collection header. These flow channels are unobstructed and can be made large enough to offer minimal restriction to flow. The internal volume of the design is minimized, therefore maximizing the space outside the strainer to collect debris.

As shown in FIG. 5, the perimeter frame about the fluid permeable screens can comprise flat bar 20 to seal the edges parallel to the corrugations and to provide strong attachment points 21 for bracing 6 and fin attachment hardware 10 and 11. These edges can also be sealed with perforated metal screen 22 to further increase the filtration surface area.

The perimeter frame about the fluid permeable screens can also comprise perforated metal caps 23 to seal the ends of the corrugations. The advantage of this type of end cap is that it adds to the perforated screen area and does not restrict flow access to the space between the fins. In the embodiment shown in FIGS. 6 and 8, end cap 40 is formed from a channel, which is then welded over the end of the fin. The advantage of this type of end cap is that it is simple to manufacture and adds significantly to the strength of the fin. It can be fully or partially perforated if extra screen area is needed.

The marginal side edge of the perimeter frame at the edge of the fin fitting into the header is adapted to a rectangular cross-section to fit the rectangular slots 9 in the header. This can be done using a toothed strip of perforated metal 24, with the edge sealed into the collection header with a flexible metal strips 25 as shown in FIG. 5. FIGS. 6 and 8 also shows a simpler design of a cap 41 for the portion of the perimeter frame at the header end of the fin. Cap 41 is formed from a channel that is welded over the ends of the corrugated metal mesh sheets. Cap 41 has large openings through which flow 43 from the channels between the corrugations communicates with apertures 9 and the flowpath enclosed in header 3. The sides of the end cap provide surfaces to attach seals 42, which ensure a good fit of the fin into the header.

Flow Equalization

Reasonably uniform flow is desirable to prevent formation of hollow-core vortexes and to ensure that debris depositing onto the strainer is not packed too densely. If the flow concentrates at one spot, debris will quickly build up at this spot in a very dense mat, raising the flow resistance enough that flow will enter at an adjacent spot, causing a dense bed to build up there also. If unrestrained, this can progress throughout the whole strainer, causing a much higher pressure loss than if the debris had built up uniformly.

Figure 7:
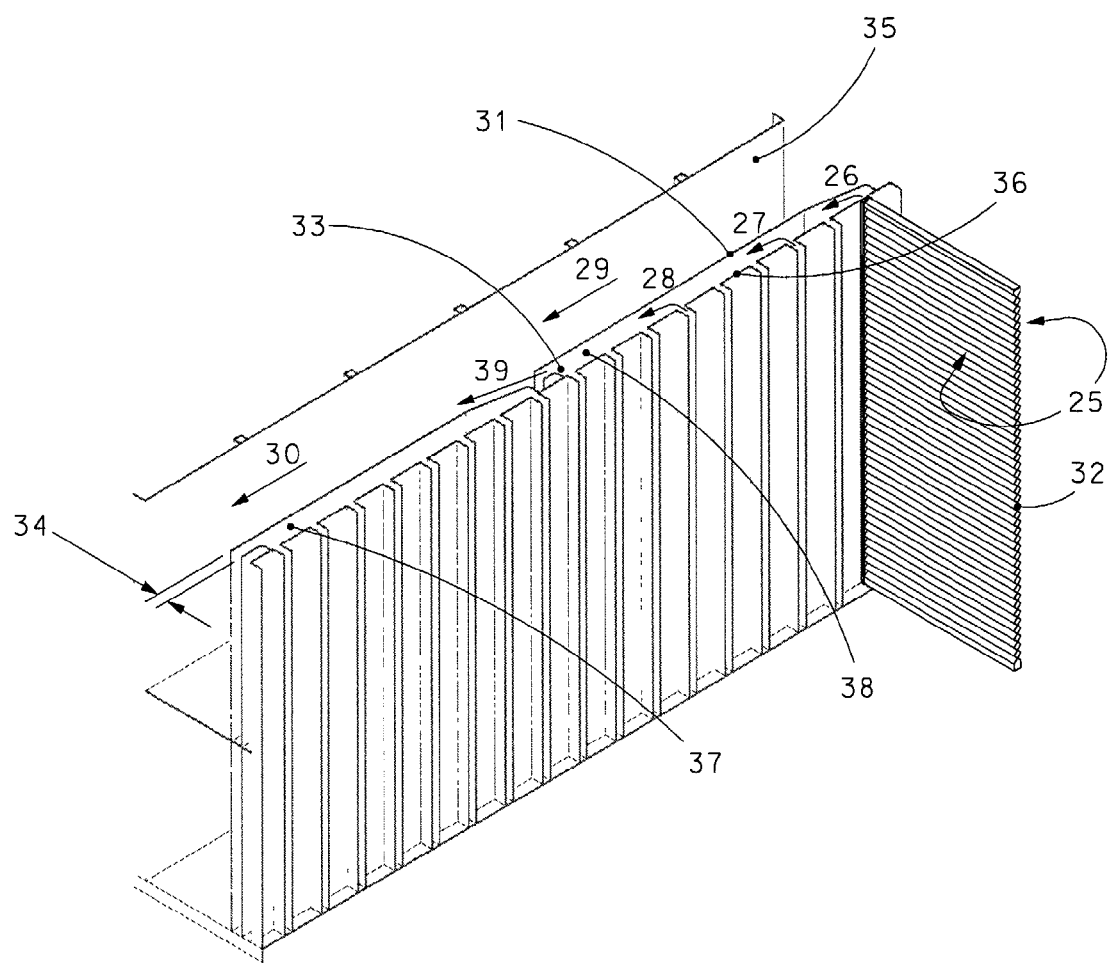
FIG. 7 is an isometric section view of flow equalization devices in accordance with an embodiment of the present invention.

In a further embodiment of the present invention shown in FIG. 7, the flow entering at various points along the length of the header is controlled using flow-balancing devices that boost the pressure inside the header. As fluid flows along the header, frictional pressure drop and acceleration pressure drop cause decreasing pressures closer to the suction end of the header (i.e., in the direction of fluid flow). This would normally provide more driving pressure for flow entering the fins, causing somewhat non-uniform flow (more flow entering fins closer to the pump intake, or suction end). To ensure that water entering any fin is subjected to the same driving pressure differential, calibrated flow-balancing devices are added, which provide greater restriction for fins closer to the suction end of the strainer than at the far end.

In accordance with a further preferred embodiment of the present invention, the flow-balancing devices provide flow restriction in a partially reversible fashion. Thus, the energy required to accelerate the flow through the flow-balancing devices is converted first to kinetic energy as a jet of water in the header pointed in the direction of flow towards the suction end. The momentum of this jet is used to boost the pressure in the header in a manner that partially offsets the upstream friction and acceleration losses. This pressure boost reduces the amount of pressure imbalance along the length of the header. A substantially uniform flow can be achieved at the same time as providing a lower overall pressure loss.

FIG. 7 shows the details of this embodiment in which all but one fin have been removed for clarity. Flows at various locations are illustrated with arrows.

Fluid flow 25 enters fin-like strainer element 32 through perforated screens, passes through the internal channels formed by the corrugations which are in fluid communication with header 35 through end cap 41 (see FIGS. 6 and 8) and slot 26. Flow from neighbouring fins similarly enters header 35 through slots 27 and 28. A relatively narrow collection channel 38 inside header 35 is defined by vertical baffle 31 running inside outer wall 36 of the header 35. Flow from the collection channel is accelerated through an orifice 33 forming a jet 39 that joins the flow 29 from upstream fins. Because the velocity of the jet 39 is substantially parallel to the velocity of the main flow 29, the pressure at downstream flow 30 is raised over that if the water were injected perpendicular to the main flow. Furthermore, because the velocity of the jet 39 is greater than the velocity of the main flow 29, momentum is added to the main flow, which boosts pressure at flow 30 over that that would exist if the flow velocity of jet 39 were the same as that of main flow at 29. In addition, the orifice 33 provides a smooth contraction for the flow so that there is minimal energy loss in creating the jet 39.

The pressure in the main header 35 drops as one moves closer to the pump intake because of friction and acceleration pressure drops. The differential pressure across orifices closer to the pump intake are therefore greater than across orifices farther away. In order to balance the flows entering the main header, the width of each orifice 33, 34 is selected so that the pressures upstream of all orifices, e.g., through each of the collection channels 38, 37 are equal. Substantially equal pressure can be achieved by providing that orifices closer to the pump intake have smaller flow area than orifices farther from the pump intake with the result that substantially uniform fluid flow is maintained through strainer elements located at different positions along the flowpath in header 3.

A flow control device in the form of an appropriately sized and shaped orifice can be provided for individual collection channels each of which encloses a plurality of apertures (as shown in FIG. 7), or in the alternative, can be provided for each individual inlet aperture.

Unless defined otherwise, all technical and scientific terms used herein have the same meaning as commonly understood by one of ordinary skill in the art to which this invention belongs.

The invention being thus described, it will be obvious that the same may be varied in many ways. Such variations are not to be regarded as a departure from the spirit and scope of the invention, and all such modifications as would be obvious to one skilled in the art are intended to be included within the scope of this application.

The embodiments of the invention in which an exclusive property or privilege is claimed are defined as follows:

1. A strainer for filtering debris from a fluid, comprising:
   i) an elongated header defining an enclosed flowpath, having an outlet for fluid communication with a suction source and a plurality of inlet apertures disposed along a length of said flowpath, said flowpath exhibiting a pressure drop in the direction of fluid flow;
   ii) strainer elements disposed in each said inlet aperture for straining debris from fluid entering said flowpath; and
   iii) a plurality of flow controlling devices, each of said flow controlling devices comprising a baffle defining a collection channel in fluid communication with one or more of said inlet apertures and terminating with an outlet orifice downstream of said one or more inlet apertures,
   wherein fluid flow from the collection channel is accelerated through said outlet orifice to form a jet that joins the fluid flow within the flowpath of the elongated header at a velocity that is greater than and substantially parallel to the velocity of the fluid flow in said flowpath of the elongated header.

2. The strainer of claim 1 wherein the outlet orifices positioned close to said suction source have a smaller flow area than the outlet orifices positioned far from said suction source.

3. The strainer of claim 2 wherein said outlet orifices are each in the form of a nozzle.

4. The strainer of claim 3 wherein said plurality of inlet apertures is a series of substantially parallel slots.

5. The strainer of claim 4 wherein the header has a generally planar side-wall and said inlet apertures are a series of substantially parallel slots formed in said side-wall in a direction transverse to said flowpath.

6. The strainer of claim 5 wherein said strainer elements are in a form of fins projecting outwardly from the apertures in said generally planar side-wall.

7. A strainer for filtering debris from a fluid, the strainer comprising:
   i) an elongated header defining an enclosed flowpath, having an outlet in fluid communication with a suction source;
   ii) a plurality of strainer elements configured for straining debris from fluid flows supplied to the header; and
   iii) a plurality of flow controlling devices, each one of the flow controlling devices comprising a collection channel in fluid communication with a corresponding discharge outlet of one or more of the strainer elements, and each one of the collection channels comprising an outlet orifice in fluid communication with the enclosed flowpath;
   wherein each outlet orifice is configured to accelerate fluid flowing from the corresponding collection channel into the enclosed flowpath so as to form a jet that joins the fluid flow within the enclosed flowpath with a velocity that has a greater magnitude and substantially parallel direction as compared to the velocity of the fluid flowing in the enclosed flowpath upstream of that outlet orifice.

8. The strainer of claim 7, wherein the outlet orifices are configured to have corresponding flow areas that decrease in the direction of fluid flow along the enclosed flowpath.

9. The strainer of claim 7 or claim 8, wherein each collection channel is defined at least partially by a corresponding baffle projected in the direction of fluid flow along the enclosed flowpath interior of a generally planar side-wall of the header.

10. The strainer of claim 9, wherein each outlet orifice is formed between the side-wall of the header and a terminal end of the corresponding baffle.

11. The strainer of claim 9, wherein the inlet apertures are a series of substantially parallel slots formed in said side-wall in a direction transverse to said enclosed flowpath.

12. The strainer of claim 10, wherein each of the strainer elements are in the form of fins projecting outwardly from the inlet apertures formed in said side-wall.

13. The strainer of claim 1, wherein the outlet orifices are configured to have corresponding flow areas that decrease in the direction of fluid flow along the enclosed flowpath.

14. The strainer of claim 1, wherein each collection channel is defined at least partially by a corresponding baffle projected in the direction of fluid flow along the enclosed flowpath interior of a generally planar sidewall of the header.

15. The strainer of claim 14, wherein each outlet orifice is formed between the side-wall of the header and a terminal end of the corresponding baffle.

16. The strainer of claim 14, wherein each of the strainer elements are in the form of fins projecting outwardly from the inlet apertures formed in said side-wall.

* * * * *